United States Patent [19]

Kondoh et al.

[11] Patent Number: 4,734,761
[45] Date of Patent: Mar. 29, 1988

[54] COLOR IMAGE RECORDING APPARATUS USING A COLOR RECORDING CATHODE-RAY TUBE WITH A BLUE-GREEN PHOSPHOR, A RED PHOSPHOR, AND BLUE, GREEN, AND RED STRIPE FILTERS

[75] Inventors: Kenichi Kondoh, Hachioji; Tetsuo Takaku, Tsurugashima; Hideki Morita; Hirotaka Hara, both of Hachioji, all of Japan

[73] Assignee: Konishiroku Photo Industry Co., Ltd., Tokyo, Japan

[21] Appl. No.: 940,151

[22] Filed: Dec. 9, 1986

Related U.S. Application Data

[63] Continuation of Ser. No. 614,466, May 25, 1984, abandoned.

[30] Foreign Application Priority Data

| Jun. 2, 1983 [JP] | Japan | 58-09178 |
| Aug. 12, 1983 [JP] | Japan | 58-148649 |
| Aug. 12, 1983 [JP] | Japan | 58-125916[U] |
| Aug. 19, 1983 [JP] | Japan | 58-151002 |
| Aug. 19, 1983 [JP] | Japan | 58-151003 |

[51] Int. Cl.$^4$ .................... H04N 1/46; H04N 1/23; H01J 29/32
[52] U.S. Cl. .................... 358/78; 358/75; 358/296; 313/461; 313/466; 313/475; 346/110 R; 346/161
[58] Field of Search .................... 358/66, 68, 75, 78, 358/80, 244, 244.1, 244.2, 296, 302, 332, 333, 334, 346, 348; 313/461, 474, 475, 364, 466, 470, 471, 472, 473; 346/110 R, 161

[56] References Cited

U.S. PATENT DOCUMENTS

| 2,200,285 | 5/1940 | Lorenzen | 358/66 |
| 3,700,955 | 10/1972 | Lowe | 346/110 R |
| 4,309,720 | 1/1982 | Denham | 358/75 |
| 4,359,745 | 11/1982 | Reid | 346/110 R |
| 4,499,501 | 2/1985 | Eriksen et al. | 358/302 |

FOREIGN PATENT DOCUMENTS

| 30259 | 3/1980 | Japan | 358/296 |
| 66843 | 5/1980 | Japan | 313/470 |
| 12247 | 1/1983 | Japan | 358/75 |
| 19073 | 2/1983 | Japan | 358/75 |
| 120240 | 7/1983 | Japan | 313/466 |

OTHER PUBLICATIONS

Chang, I. F., et al., "Application of Time Delay Integration To Electrophotographic Printing", *IBM Technical Disclosure Bulletin*, vol. 22, No. 12, May 1980, pp. 5569–5570.

Primary Examiner—James J. Groody
Assistant Examiner—Randall S. Svihla
Attorney, Agent, or Firm—Jordan B. Bierman

[57] ABSTRACT

A color image recording apparatus for recording a color image uses a cathode-ray tube having a screen with an inner surface to be bombarded with an electron beam, which is coated in a striped manner with a first fluorescent material for emitting blue and green light and with a second fluorescent material for emitting red light, and its outer surface is provided with a blue filter and a green filter each opposed to a respective portion of the first fluorescent material, and with a red filter opposed to the second fluorescent material. Successive scanning lines are formed on a surface by relatively moving the position of the scanning line on the surface in a direction perpendicular to said scanning direction so that each scanning line is scanned by light from each of the colors.

4 Claims, 26 Drawing Figures

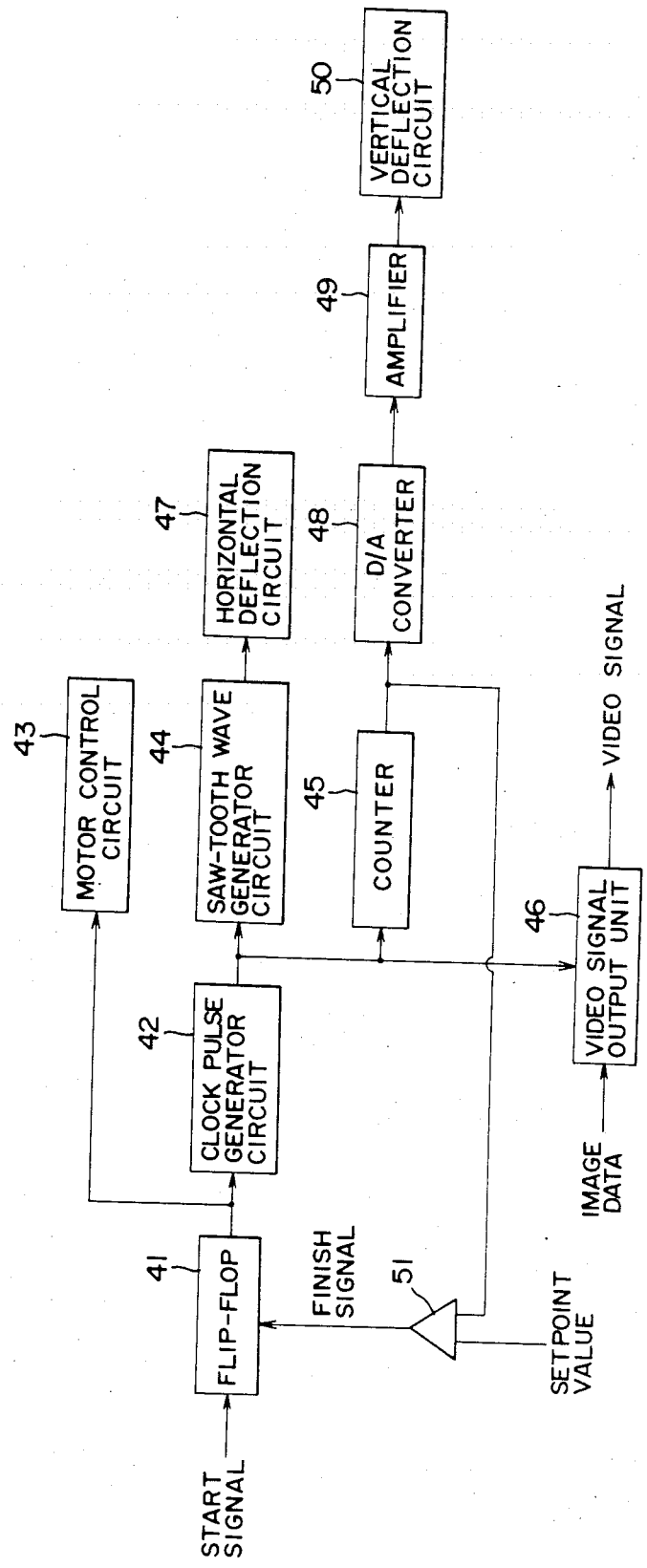

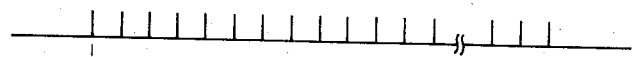
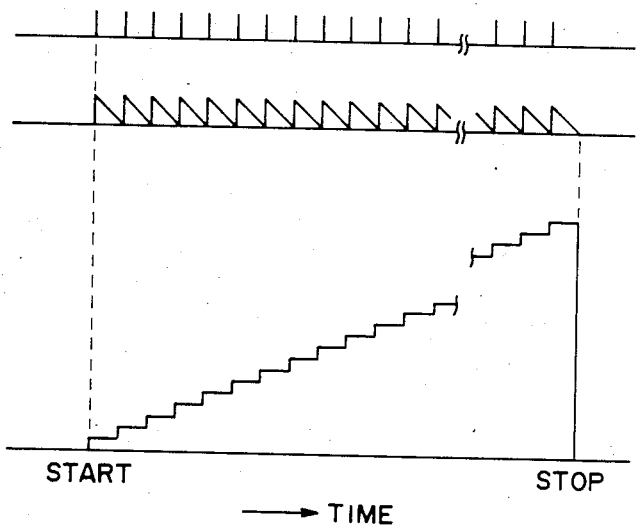
FIG. 5(a)
FIG. 5(b)
FIG. 5(c)
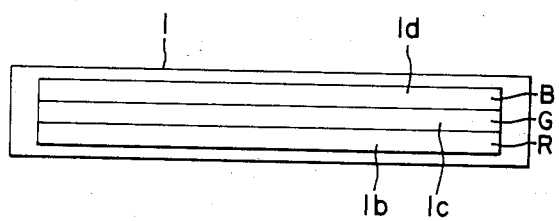
FIG. 6
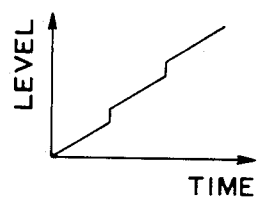
FIG. 7

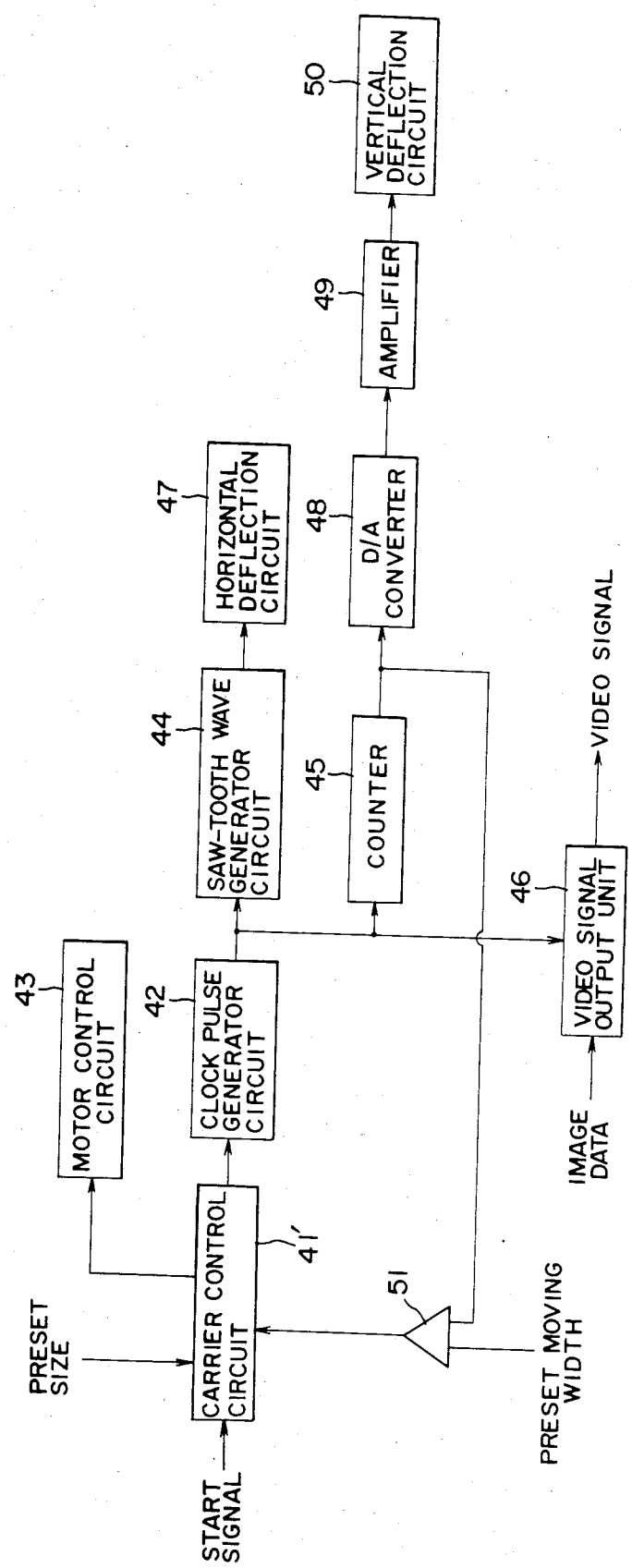

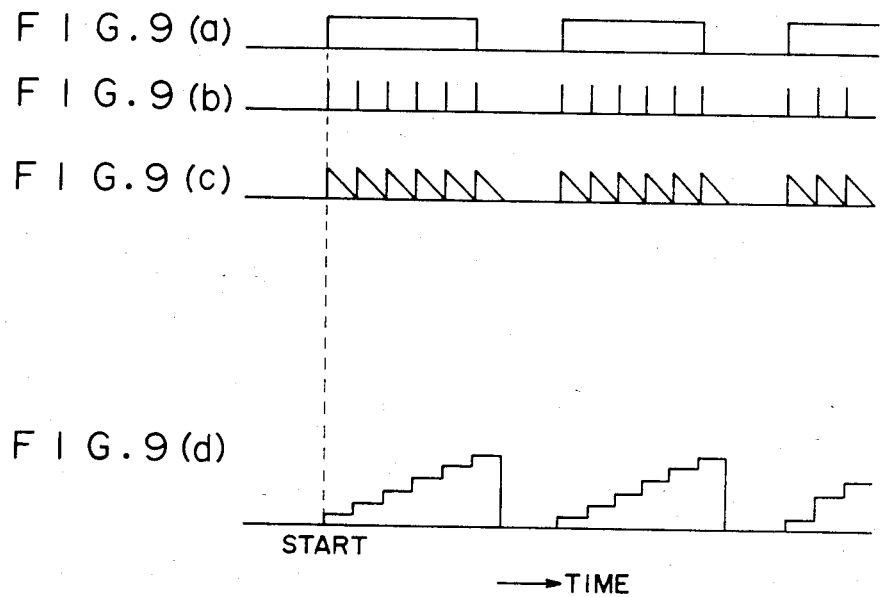
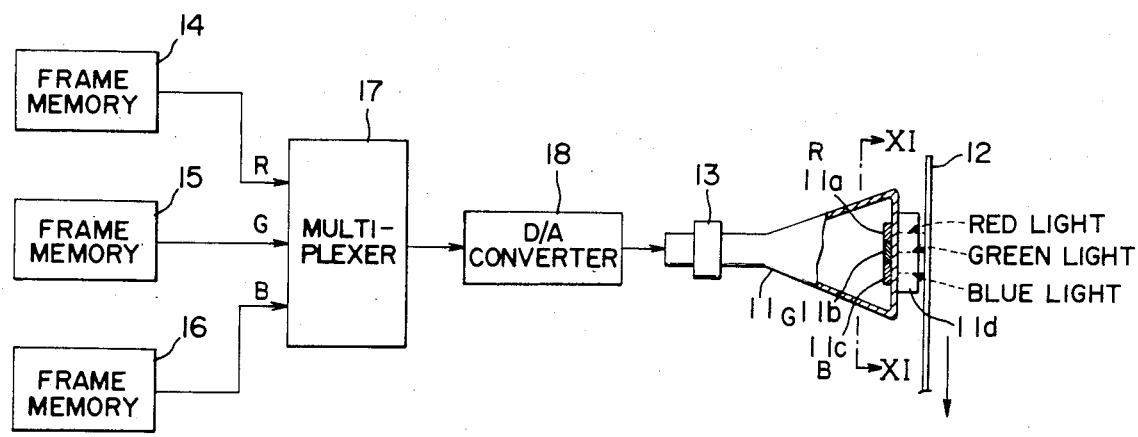

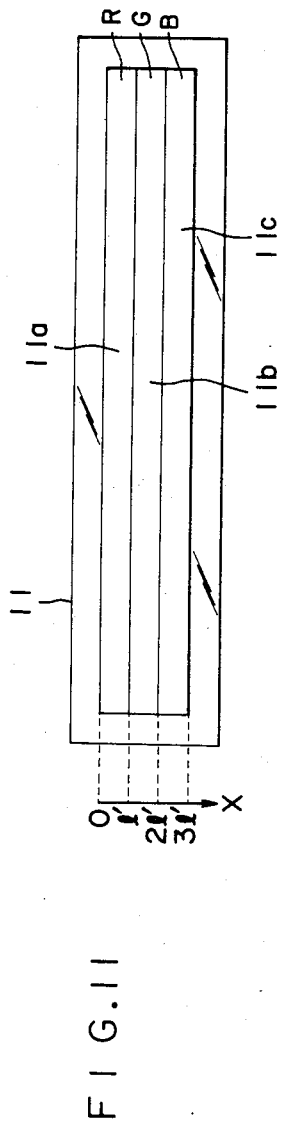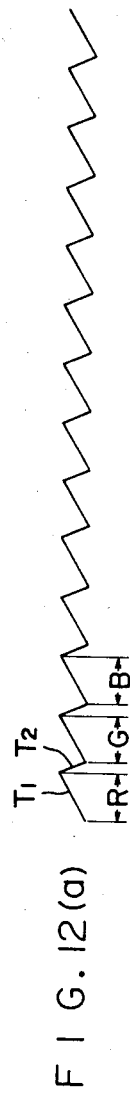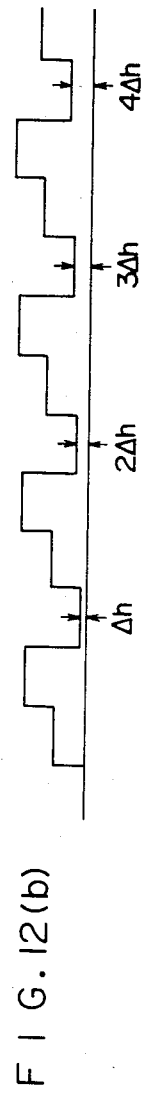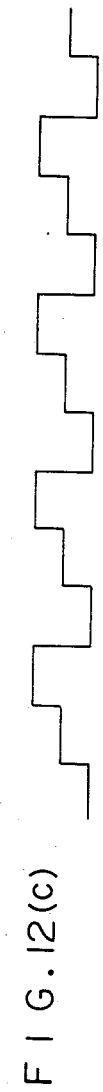
FIG. 11
FIG. 12(a)
FIG. 12(b)
FIG. 12(c)
FIG. 12(d)

F I G. 13(a)
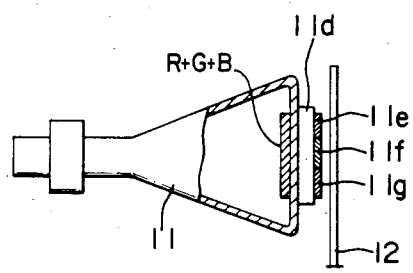
F I G. 13(b)
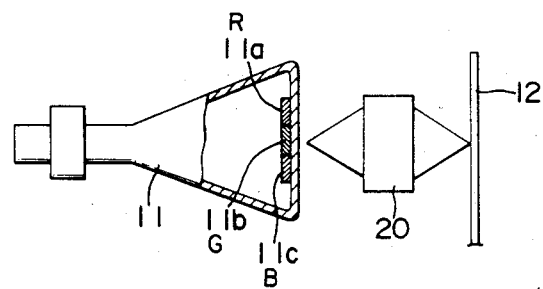
F I G. 13(c)
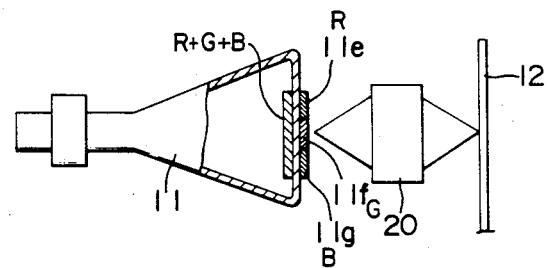

COLOR IMAGE RECORDING APPARATUS USING A COLOR RECORDING CATHODE-RAY TUBE WITH A BLUE-GREEN PHOSPHOR, A RED PHOSPHOR, AND BLUE, GREEN, AND RED STRIPE FILTERS

This application is a continuation of application Ser. No. 614,466, filed May 25, 1984, now abandoned.

BACKGROUND OF THE INVENTION

1. Field of the Invention

The present invention relates to an image recording apparatus employing a cathode-ray tube (inclusive of an optical fiber tube) as an exposure means. More specifically, the invention relates to an image recording apparatus employing, as an exposure means, a cathode-ray tube in which a fluorescent surface is scanned by an electron beam.

2. Description of the Prior Art

A cathode-ray tube, for example, an optical fiber tube used in the image recording apparatus of this type has a flat fluorescent surface. Therefore, the distance between an electron gun for emitting an electron beam and the fluorescent surface is small at the central portion of the fluorescent surface and increases toward the end portions. As a matter of course, therefore, brightness is high at the central portion and decreases toward the end portions. The above-mentioned problem which stems essentially from the construction can be solved by a method in which the grid voltage is controlled to a predetermined value in synchronism with the scanning of electron beam, i.e., solved by a method of increasing the grid voltage at the time of scanning the end portions, or by a method according to which brightness during the scanning is measured by a photosensor, and a brightness correction signal is produced based upon the measured data to change the grid voltage, in order to make uniform the brightness in the central portion and the end portions.

On the other hand, irregular brightness also stems from irregularly applied fluorescent material. The problem of irregular brightness of this type is not satisfactorily solved by the above-mentioned two methods. This is because, irregularly applied fluorescent material produces irregular brightness. Therefore, of the above-mentioned two methods, the former method is not at all effective to cope with it. Even with the latter method, the limit is determined by the resolving power of photosensor. The irregular brightness further results from varying sweep speed of the electron beam. In either case, irregular brightness turns out to be irregular exposure for the photosensitive members. In the case of the optical fiber tube, irregular exposure is also caused by variance in the transmission quantity that is affected by the condition of each fiber of the optical fiber array (e.g. affected by the condition of end surface of the optical fiber).

With the current technique, it is difficult to remove the problem of irregular exposure as mentioned above. Therefore, when a hard copy is to be obtained by using the image recording apparatus of this kind, there will be no problem when a binary image is to be dealt with. A great problem, however, arises when a hard copy of continuous tone image is to be obtained. That is, irregular exposure in the direction of main scanning produces blurring of lines in the subscanning direction on the image that is recorded by moving the photosensitive member in the subscanning direction, and the image quality is deteriorated. For instance, a blur of white lines or black lines in the subscanning direction appears in the black-and-white continuous tone image.

FIG. 1 shows construction of a known apparatus for recording color image by using cathode-ray tubes of the scanning type. According to this construction, image data of corresponding colors are given to cathode-ray tubes 1', 2' and 3' of which the fluorescent surfaces are coated with a red fluorescent material, a green fluorescent material and a blue fluorescent material, respectively, and red light, green light and blue light produced from these cathode-ray tubes 1', 2' and 3' are superposed by a synthesizing prism 4' and are permitted to be incident upon a film (exposed portion) 7' via an image-forming lens 5' and a tilted reflector mirror 6'. Reference numeral 8' denotes a stage which is moved right and left by a step motor (not shown). The mirror 6' and the film 7' move on the stage 8' so as to be subjected to the subscanning. This recording apparatus, however, requires three cathode-ray tubes 1' to 3', resulting in increased size.

Another known conventional apparatus employs a single cathode-ray tube of which the surface to be scanned with electron beam is coated with fluorescent materials of three colors, i.e., red, green and blue, in the form of stripes. In this recording apparatus, exposure of each color is separately effected. Namely, the exposed portion is returned to the initial position three times repetitively, and the exposure is effected based upon the image data of each of the colors during each carry, to obtain a color image. This apparatus is free from the defects of the above-mentioned conventional apparatus. However, a complex mechanism is employed to return the exposed portion to the initial position, and to so carry the above portion again that images of each of the colors are superposed. Therefore, the apparatus becomes bulky. Despite the bulky apparatus, position for exposure to three colors lights deviates greatly, and a good color image is not obtained.

Further, in a recording cathode-ray tube used in a color recording apparatus, a fluorescent material applied onto the bombarding surface (back side of the light-emitting surface) is scanned with the electron beam, and the exposure is effected by utilizing the emitted light. For example, a white fluorescent material is applied onto the whole surface to which the electron beam will be bombarded, and a filter for blue color, a filter for green color and a filter for red color are stuck in the form of stripes onto the light-emitting surface (surface of the tube), to obtain blue light, green light and red light.

The white fluorescent material, however, is not capable of emitting the light in constant quantity with regard to the wavelength. A P4 fluorescent material, which is generally used as a white fluorescent material, emits the light in small amounts in a wavelength region of red color (600 nm and larger). Therefore, if it is attempted to obtain blue light, green light and red light by passing the light emitted by the white fluorescent material through filters in a customary manner, the intensity of red light becomes smaller than the lights of other colors.

It has also been proposed to apply three fluorescent materials for obtaining blue color, green color and red color in the form of stripes onto the bombarding surface of the recording cathode-ray tube onto which the electron beam will be bombarded. To apply three fluorescent materials in the form of stripes, however, involves considerable technical difficulty.

SUMMARY OF THE INVENTION

An object of the present invention is to realize a simply-constructed image recording apparatus which does not develop the above-mentioned blur of fine stripes caused by irregular exposure.

In order to achieve the above-mentioned object, an embodiment of the present invention deals with an image recording apparatus which employs as an exposure means a cathode-ray tube of which the fluorescent surface is scanned with an electron beam wherein the position of scanning line formed by the electron beam on the fluorescent surface is moved in a direction perpendicularly to the direction of said scanning, accompanying the progress of recording.

In order to achieve the above-mentioned object, another embodiment of the present invention deals with an image recording apparatus which employs as an exposure means a cathode-ray tube of which the fluorescent surface is scanned with an electron beam wherein the exposure is effected while moving the position of scanning line formed by the electron beam on the fluorescent surface in a direction perpendicularly to the direction of said scanning, an exposed portion is maintained stationary during the period of exposure, the exposure is interrupted every after the movement of the position of said scanning line has finished, and the exposure is started again after said exposed portion is fed by a predetermined amount, such that the whole surface is exposed.

A further object of the present invention is to provide an image recording apparatus which employs a single cathode-ray tube, and in which the exposed portion needs be carried only once, to obtain a good color image.

In order to achieve the above-mentioned object, still further embodiment of the present invention deals with an image recording apparatus which employs as an exposure means a cathode-ray tube of the scanning type equipped with a striped light-emitting portion which emits red, green and blue lights maintaining a predetermined scanning distance, wherein the light of each color is emitted in a switched manner for every scanning line, and said cathode-ray tube is furnished with the image data of each color being deviated by an amount of said scanning distance of each color.

Yet further object of the present invention is to provide an image recording apparatus which employs a single cathode-ray tube, and in which the exposed portion needs be carried only once, to obtain a good color image without containing the blur of fine stripes.

In order to achieve the above-mentioned object, an embodiment of the present invention deals with an image recording apparatus which employs as an exposure means a cathode-ray tube of the scanning type equipped with a striped light-emitting portion which emits red, green and blue lights maintaining a predetermined scanning distance, wherein the exposure to each color is effected in a switched manner for every scanning line, and the position of scanning line of each color is deviated toward a direction perpendicularly to the scanning direction.

A further object of the present invention is to provide a recording cathode-ray tube which can be manufactured relatively simply and which does not develop difference in the output regardless of the wavelengths.

In order to achieve the above-mentioned object, an embodiment of the present invention deals with a recording cathode-ray tube, in which the surface to be bombarded with a cathode ray is coated with a first fluorescent material for blue and green colors and with a second fluorescent material for red color, as a striped manner, and the light-emitting surface is provided with a filter for blue color and a filter for green color so as to be opposed to the first fluorescent material, and with a filter for red color so as to be opposed to the second fluorescent material.

BRIEF DESCRIPTION OF THE DRAWINGS

FIG. 4 is a block diagram which concretely illustrates the control portion of FIG. 2;

FIGS. 5(a) to 5(c) are diagrams illustrating operation waveforms of the circuit of FIG. 4;

FIG. 6 is a diagram which illustrates the color image recording;

FIG. 7 is a diagram of waveform of a vertically deflected signal according to another embodiment of the present invention;

FIG. 8 is a block diagram which concretely illustrates the control portion of FIG. 2 according to another embodiment of the present invention;

FIGS. 9(a) to 9(d) illustrate operation waveforms of the circuit of FIG. 8;

FIG. 10 is a diagram showing the setup of a further embodiment of the present invention;

FIG. 11 is a view along the arrow XI—XI of FIG. 10;

FIGS. 12(a) to 12(d) are waveform diagrams of deflecting signals employed in the apparatus of FIG. 10;

FIGS. 13(a) to 13(c), and FIG. 14 are diagrams illustrating further embodiments according to the present invention.

DESCRIPTION OF THE PREFERRED EMBODIMENTS

Figure 1:
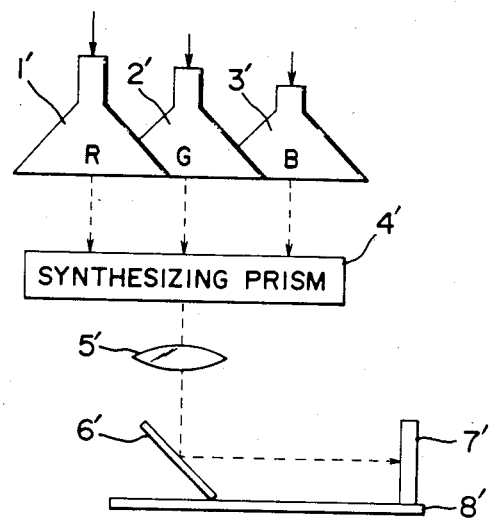
FIG. 1 is a diagram showing a conventional image recording apparatus.
Figure 2:
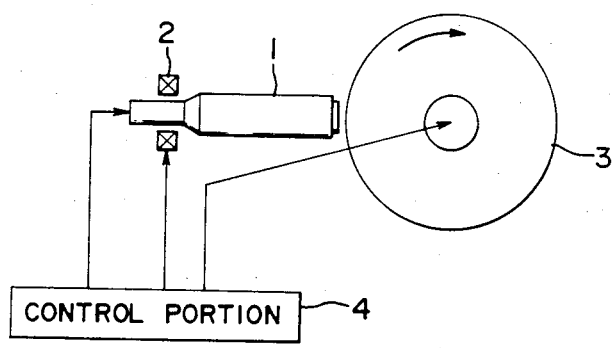
FIG. 2 is a diagram showing the major portions according to an embodiment of the present invention.
Figure 3:
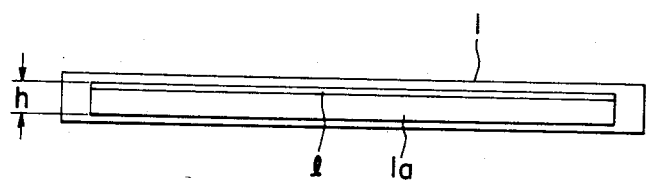
FIG. 3 is a front view of a cathode-ray tube of FIG. 2.

FIG. 2 is a diagram showing the major portions according to an embodiment of the present invention, in which reference numeral 1 denotes a cathode-ray tube. A plan view of the cathode-ray tube 1 is shown in FIG. 3. The cathode-ray tube 1 has a fluorescent surface 1a at the center thereof. Reference numeral 2 denotes a deflecting coil provided for the calthode-ray tube 1. Here, a horizontal deflection coil only is shown. Reference numeral 3 denotes a rotary drum which holds on the surface thereof films of the instant type or a variety of photosensitive films (photosensitive members), or of which the surface may be made of a photosensitive member. A film to be held by the rotary drum 3 should preferably be composed of a diffusion transfer photosensitive material. The diffusion transfer photosensitive material referred to here may be constituted, for example, in the form of an instant-type film. Namely, in this film, a reversal emulsion is used for the photosensitive layers, and a layer containing a dye releaser consisting of a combination of a pigment and nondiffusing groups, is provided under each of the photosensitive layers. Therefore, a silver halide of a sensitized portion is not developed by the reversal emulsion, but the silver halide in the nonsensitized portion is reduced by a developer. At the same time, a developing agent is oxidized. Therefore, a dye releaser emits a pigment due to the action of the oxide thereof and an alkali. A pigment having diffusing property is diffused and transferred onto an image-receiving layer. That is, the pigment couples with a chelate compound in the image-receiving layer to form a positive image of pigment. Use of this film enables the processing to be carried out within short periods of time, and the obtained image exhibits excellent resolving power and color reproducibility that are comparable with those of general silver salt films.

Reference numeral 4 denotes a control portion which sends video signals to the cathode-ray tube 1, which sends deflecting signals to the deflection coil 2, and which controls the running speed of the rotary drum 3. FIG. 4 concretely shows the setup of the control portion 4, wherein reference numeral 41 denotes a flip-flop of which the output rises upon receipt of a record start signal and drops upon receipt of a record finish signal from a comparator 51 that will be described later. The output of the flip-flop 41 is sent to a clock pulse generator circuit 42 and to a motor control circuit 43. When the flip-flop 41 produces the output of the high level, the clock pulse generator circuit 42 produces clock pulses shown in FIG. 5(a) to a saw tooth wave generator circuit 44, a counter 45 and to a video signal output unit 46. Further, when the flip-flop 41 produces the output of the high level, the motor control circuit 43 works to drive a motor (not shown) at a constant speed to turn the rotary drum 3. In synchronism with the clock pulses, the saw-tooth wave generator circuit 44 sends saw-tooth waves (FIG. 5(b)) to a horizontal deflection circuit (which deflects the electron beam toward the direction of main scanning) 47. The counter 45 counts the number of clock pulses. The counted value is converted into a saw-tooth wave (refer to FIG. 5(c)) via a D/A converter 48 and an amplifier 49, and is applied to a vertical deflection circuit (which deflects the electron beam toward a direction at right angles with the direction of main scanning) 50, and is also applied directly to one input terminal of a comparator 51. The comparator 51 compares the counted value with a setpoint value of the number of main scanning applied to the other input terminal thereof. As the number of main scanning reaches the setpoint value, the output of the flip-flop 41 is caused to break. In synchronism with the clock pulses, furthermore, the video signal output unit 46 produces a video signal for one scanning line. A relation between the rotating speed of the rotary drum 3 and a deflecting step in a direction at right angles with the main scanning direction of electron beam, has been selected, for example, in a manner that deflection for the whole width (h in FIG. 3) of the fluorescent surface is finished when the rotary drum 3 has rotated once (i.e., when the recording of image has been finished). However, this relation needs not necessarily be maintained. Further, the problem associated with the expansion or contraction of the recording image which stems from the deviated position of scanning line, can be easily avoided by suitably selecting the rotating speed of the rotary drum 3.

According to the above-mentioned embodiment, the scanning line 1 moves toward a direction at right angles with the scanning line 1 accompanying the progress of recording as shown in FIG. 3. Therefore, the irregularity of exposure on each scanning line varies every time in a random fashion, and the stripes do not appear.

Further, the color image can be recorded by a method according to which the light-emitting surface of the cathode-ray tube 1 is covered with color filters 1b, 1c and 1d of red, green and blue colors as shown in FIG. 6, the color filters are scanned with color-decomposed video signals, and a color picture is recorded on the photosensitive member based upon the principle of additive color process. There also exists a method of recording color images by coating the fluorescent surface separately with the fluorescent materials of red, green and blue colors. The present invention can, as a matter of course, be adapted to the image recording apparatus which are based upon the above-mentioned methods. For instance, the drum is rotated a total of three times for each color, the photosensitive member is exposed to the light which has transmitted through the corresponding color filter or which has been emitted from the corresponding fluorescent material for each rotation, and the scanning line is moved within the width of the color filter of the corresponding color or of the fluorescent material during each rotation. In this case, however, scanning on the boundary portions of the colors develop a problem of color mixture. Therefore, signals which perform the scanning flying over the boundary portions, for example, signals of a waveform shown in FIG. 7, must be selected to be used as vertically-deflecting signals.

The present invention can further be adapted to such an image recording apparatus in which a photosensitive resin of a type different from the above-mentioned photosensitive members, or a photo-sensitive member such as Se or amorphous silicon used for the electrophotography, is used as an image carrier to receive the light from the exposure means, and an electrostatic latent image or a toner is formed by the electrophotographic method, and is transferred onto a recording material.

As described above, the present invention has been made in order to reliably prevent the blur of fine stripes that stem from irregular exposure. Here, the setup required for this purpose is simply to vertically deflect the electron beam.

FIG. 8 shows the control portion 4 according to another embodiment of the present invention, in which reference numeral 41' denotes a carrier control circuit which controls the feed of the exposed portion so that the whole surface of the exposed portion (film or the like) is exposed. The carrier control circuit 41' controls the motor control circuit 43 or the clock pulse generator circuit 42 responsive to a record start signal or a finish signal sent from the comparator 51 that will be described later. Upon receipt of a pulse produced by the carrier control circuit 41', the motor control circuit 43 rotates an exposed portion, i.e., rotates the rotary drum 3 by a predetermined amount. When the carrier control circuit 41' produces an output of the high level in FIG. 9(a), the clock pulse generator circuit 42 produces clock pulses shown in FIG. 9(b) to the saw-tooth wave generator circuit 44, to the counter 45 and to the video signal output unit 46. In synchronism with the clock pulses, the saw-tooth wave generator circuit 44 supplies saw-tooth waves (refer to FIG. 9(c)) to the horizontal deflection circuit (which deflects the electron beam toward the direction of main scanning) 47. The counter 45 counts the number of clock pulses. The counted value is converted into a saw-tooth wave (refer to FIG. 9(d)) via the D/A converter 48 and the amplifier 49, and is applied to the vertical deflection circuit (which deflects the electron beam toward the direction at right angles with the direction of main scanning) 50 and is further input directly to one input terminal of the comparator 51. The comparator 51 compares the counted value with a preset moving width (number of times of main scanning) for moving the position of scanning line input to the other input terminal thereof, and sends a signal to the carrier control circuit 41' when the moving width (number of times of main scanning) reaches the preset value. In synchronism with the clock pulses, furthermore, the video signal output unit 46 produces a video signal for one scanning line. Here, the amount for moving the position of scanning line in a direction (direction of subscanning) at right angles with the direction of main scanning, is selected to be equal to the amount for carrying the exposed portion.

Operation of the above-mentioned embodiment will be described below. First, upon receipt of a record start signal, the carrier control circuit 41' sends an output of the high level to the clock pulse generator circuit 42. Therefore, the electron beam which is brightness-modulated with video signals, is deflected horizontally and vertically. That is, accompanying the progress of recording, the scanning line 1 of FIG. 3 moves in a direction (downwardly) at right angles with the scanning line 1. As the moving width reaches a predetermined amount h, and the comparator 51 produces the signal to the carrier control circuit 41', the clock pulse generator circuit 42 receives the output from the carrier control circuit 41', whereby the counter 45 is reset after a predetermined period of time has passed. The carrier control circuit 41' further sends a control pulse to the motor control circuit 43 to move the rotary drum 3 by one step in a direction of arrow in FIG. 2. After the movement, the carrier control circuit 41' sends again the output of the high level to the clock pulse generator circuit 42 to perform the deflecting operation in the same manner as described above. The above-mentioned operation is repeated several times, and the total amount of feeding of the rotary drum 3 reaches the preset size of the exposed portion. Then, all of the operations are stopped. Thus, the whole surface of the exposed portion is exposed.

With the above-mentioned setup, the scanning line 1 moves in a direction at right angles with the direction of main scanning, accompanying the progress of recording. Therefore, the irregularity of exposure on each scanning line varies every time in a random fashion, and blurring of the lines does not occur.

FIG. 10 is a diagram showing the setup according to a further embodiment of the present invention, in which reference numeral 11 denotes a cathode-ray tube of the scanning type, which in this case is an optical fiber tube. As shown in FIG. 11 (view along the arrow XI—XI of FIG. 10), the fluorescent surface of the cathode-ray tube 11 is coated in a striped manner with a red fluorescent material 11a, a green fluorescent material 11b and a blue fluorescent material 11c. When scanned with the electron beam, the fluorescent materials 11a, 11b, 11c forming the striped light-emitting portions produce red light, green light and blue light, respectively. In FIG. 10, these lights pass through an optical fiber 11d having an optical axis in the right and left direction in the drawing, and are permitted to be incident upon an exposed portion 12. The exposed portion 12 may be a film of the instant type or photosensitive films (photosensitive members) of various types. The film should preferably be composed of a diffusion transfer photosensitive material.

Reference numeral 13 denotes a deflection coil of the cathode-ray tube, which vertically and horizontally deflects the electron beam that is emitted from an electron gun. FIGS. 12(a) and 12(b) show horizontally-deflecting signals and vertically-deflecting signals that are applied to the deflection coil 13. In FIG. 12(a), $T_1$ denotes an effective scanning period, $T_2$ denotes a flyback period, and symbols R, G and B denote effective scanning periods when red, green and blue image data are given to the cathode-ray tube 11.

Vertically-deflecting signals of FIG. 12(b) are obtained by adding the signals of FIGS. 12(c) and 12(d). The base line increases stepwise by $\Delta h$ after every scanning, and the scanning is carried out a total of three times for each of the colors. Further, it is desirable that the distance between the scanning lines produced by the electron beam on the fluorescent surface is selected to be $l'$ (mm) as shown in FIG. 11 when the horizontally-deflecting signal is produced in the period of R, G or B (in the same cycle of unit scanning). The scanning lines of these colors run on the fluorescent materials 11a, 11b and 11c, as a matter of course. At the time of starting, for example, the scanning lines of these colors are located at the positions of upper ends of each of the regions on the light-emitting surface of FIG. 11 (i.e., the scanning line of red light is located at $X=0$, the scanning line of green light is located at $X=l'$, and the scanning line of blue light is located at $X=2l'$). As the exposed portion 12 is carried, the positions of scanning lines of these colors are deviated toward the direction perpendicularly to the direction of scanning. Namely, the value $\Delta h$ is so selected that at the moment when the exposed portion 12 has been carried (i.e., when the recording of color picture is finished), the scanning lines of these colors move to the positions of $X=l'$, $X=2l'$ and $X=3l'$. The procedure may of course be carried out in the reverse order. That is, when a piece of image consists of M scanning lines for each of the colors, the deviating amount $\Delta X$ (mm) for the unit scanning of each time is given by $\Delta X = l'/M$.

Reverting to FIG. 10, reference numerals 14, 15 and 16 denote frame memories which store image data for exposure with red light, green light and blue light. The data in the frame memories 14 to 16 are selected by a multiplexer 17, and are fed to the cathode-ray tube 11 via a D/A converter 18.

Here, the exposed portion 12 is carried downwardly (direction of arrow) in FIG. 10 at a constant speed. The data are read out from the frame memories 14, 15, 16 as described below. That is, when the frame memory 14 produces the data corresponding to i-th scanning line as a scanning line data of red color, the frame memory 15 produces the (i-k)th data as a scanning line data of green color, and the frame memory 16 produces the (i-2k)th data as a scanning line data of blue color. Here, k denotes a constant which is determined by $l'$ and the like, and is so selected that the data of each color at the same position of the original picture is given to the same position on the exposed portion 12.

According to a further embodiment of the present invention, the exposed portion 12 is carried downwardly (direction of arrow) in FIG. 10, and the carrier speed is 1/n (mm) for the scanning of a total of three times to cover each of the colors. However, this value is when the resolution of the system is set to be n dots per millimeter.

The data are read out from the frame memories 14, 15, 16 as described below. That is, when the frame memory 14 produces the data corresponding to the i-th scanning line as a scanning line data of red color, the frame memory 15 produces the (i-l'n)th data as a scanning line data of green color, and the frame memory 16 produces the (i-2l'n)th data as a scanning line data of blue color. For example, when n=10 dots/mm and l'=3 mm, the green data is produced being delayed behind the red data by 30 scanning lines, and the blue data is produced being delayed behind the green data by 30 scanning lines. This is to give the data of each color at the same position of the original picture to the same position on the exposed portion.

According to the above-mentioned setup, the exposed portion 12 is downwardly carried in FIG. 10, and is exposed to one scanning line of red image data, to one scanning line of green image data, and then to one scanning line of blue image data, repetitively. Therefore, the position exposed to the red image data on the exposed portion 12 is again to the green image data at the k-th cycle, and is further exposed to the blue image data at the 2k-th cycle. The exposure of the above-mentioned position to three color lights is thus finished. The above-mentioned exposure is effected for all surface of the exposed portion 12, and a color image is obtained through developing. In this case, deviation of exposure position for three color lights can be substantially eliminated, and good color image can be obtained. According to the above-mentioned setup, furthermore, the position of scanning line in the same color moves toward a direction at right angles with the scanning line accompanying the progress of recording. Therefore, the irregularity of exposure for each scanning line varies every time in a random fashion, and the above-mentioned blur of fine stripes do not appear.

In the above-mentioned embodiment, the optical fiber tube is used by applying the fluorescent materials 11a to 11c of three colors in a striped manner to form a striped light-emitting portion. As shown in FIG. 13(a), however, it is also allowable to use a generally employed white fluorescent material, and to stick color filters 11e, 11f and 11g of red, green and blue colors in a striped manner on the light-emitting surface (on the surface of the optical fiber 11d, in this case). As shown in FIGS. 13(b) and 13(c), furthermore, the optical system for exposure may be constituted by using a lens array 20 which consists of an array of optical transmission members having focusing property, instead of an array of optical transmission members without having focusing property such as optical fibers. FIG. 13(b) shows the case of using the cathode-ray tube 11 in which red, green and blue fluorescent materials 11a, 11b and 11c are applied in the form of stripes in the scanning direction, and FIG. 13(c) shows the case of using the cathode-ray tube 11 in which the light-emitting surface is covered with red, green and blue color filters 11e, 11f and 11g. Furthermore, if loss of exposure can be permitted, the optical system may employ a large lens.

Figure 14:
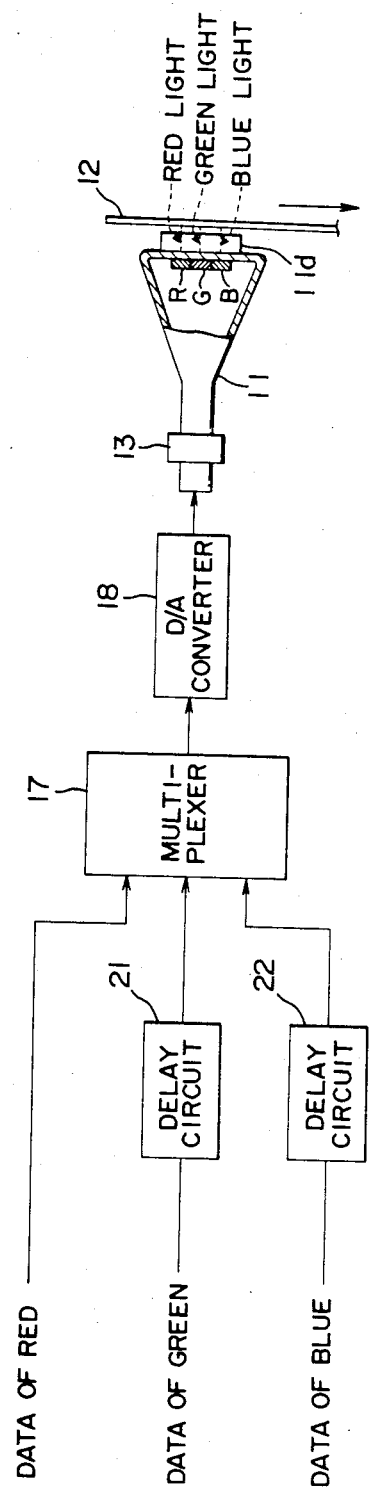

The above embodiment has dealt with an apparatus having frame memories. As shown in FIG. 14, furthermore, it is also possible to so construct the apparatus that red, green and blue image data at the same position of the original image are received simultaneously, wherein the red image data is directly fed to the multiplexer 17, the green image data is fed to the multiplexer 17 via a delay circuit 21 which gives a delay corresponding to k scanning lines, and the blue image data is fed to the multiplexer 17 via a delay circuit 22 which gives a delay corresponding to 2k scanning lines. These delay circuits will not needed if input image data are supplied from the external unit in a delayed manner.

Moreover, the exposed portion may be carried in the reverse direction, or the position of scanning line may be shifted in the reverse direction.

The foregoing description has dealt with the case in which the deflection is vertically effected one time through one time of image recording. The invention, however, needs not be limited to this relation only. In this case, the recording position on the exposed portion will be deviated at the time when the vertical deflection which has reached the end is to be returned to the start position. This, however, can be solved by controlling the carrier system.

According to the above-mentioned embodiment of the present invention, it is possible to realize an image recording apparatus which employs a single cathode-ray tube, and which produces good color images without developing the blur of fine stripes.

Figure 15:
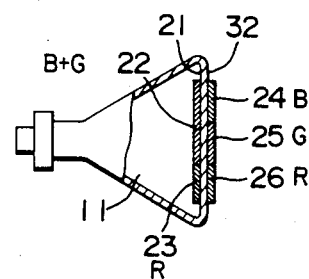
FIG. 15 is a section view of a cathode-ray tube according to still further embodiment of the present invention.
Figure 16:
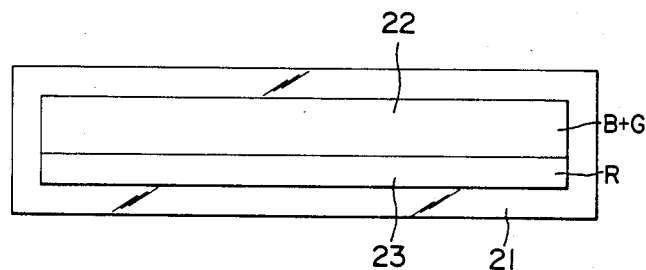
FIG. 16 is a front view of a bombarding surface of the cathode-ray tube of FIG. 15.

According to a yet further embodiment of the present invention as shown in FIGS. 15 and 16, a first fluorescent material 22 for blue and green colors, and a second fluorescent material (having a width about one-half the width of the first fluorescent matterrial 22) 23 for red color are applied in a striped manner onto a bombarding surface 21 of the cathode-ray tube 11. On a light-emitting surface 32, a filter 24 for blue color and a filter 25 for green color are stuck in a striped manner to the upper half portion and to the lower half portion so as to correspond to the first fluorescent material 22, and a filter 26 for red color is stuck in a striped manner to a position to correspond to the second fluorescent material 23. Here, the first fluorescent material 22 may be a P4 fluorescent material which is a white fluorescent material, or may be a P31 fluorescent material which produces light of wavelengths of color and green color. The second fluorescent material 23 may, for example, be a P22RE fluorescent material ($Y_2O_2S$:Eu, $YVO_4$:Eu or $Y_2O_3$:Eu) which produces light of wavelengths of red color.

Being constructed as mentioned above, the filter 24 for blue color produces blue light, the filter 25 for green color produces green light, and the filter 26 for red color produces red light. A silver salt color-print film or the like is exposed to these lights to obtain color recording. According to this embodiment, the two fluorescent materials need be applied onto the cathode-ray bombarding surface 21, which is simpler than when three fluorescent materials have to be applied in the conventional art. Further, since two fluorescent materials, i.e., one for blue and green colors and one for red color, are applied to the cathode-ray bombarding surface 21, or in other words, since the red fluorescent material is applied for producing red light, the output of red light can be intensified compared with when blue light, green light and red light are obtained from the light of a single white fluorescent material, and the different in the output intensities can be reduced regardless of the wavelengths.

According to the embodiment of the present invention as described above, it is possible to relatively easily produce a cathode-ray tube for recording images, which develops little difference in the output intensities regardless of the wavelengths, and which enables color recording of high quality to be obtained.

What is claimed is:

1. A color image recording apparatus for recording a color image, comprising a cathode-ray tube, said cathode-ray tube including a screen having an inner surface to be bombarded by an electron beam, said inner surface being coated in a striped manner with a first fluorescent material for emitting blue and green light when bombarded by said electron beam, and with a second fluorescent material for emitting red light when bombarded by said electron beam, said screen further having an outer surface for emitting light emitted by said fluorescent materials, said outer surface being provided with a blue filter and a green filter each opposed to a respective portion of said first fluorescent material, and with a red filter opposed to said second fluorescent material.

2. The apparatus of claim 1, further comprising a surface to be scanned by said light emitted by said outer surface of said screen of said cathode-ray tube, an optical system interposed in front of said cathode-ray tube for directing said emitted light to said surface to be scanned, and means for controlling said electron beam and the relative positions of said cathode-ray tube and said surface to be scanned to form successive scanning lines of a color image on said surface to be scanned, said scanning lines extending in a scanning direction, said red, green, and blue filters provided on said outer surface of said screen each comprising a stripe filter extending in said scanning direction, said red, green, and blue stripe filters being successively arranged in a direction perpendicular to said scanning direction, wherein each scanning line of said color image is formed by relatively moving said surface to be scanned in said direction perpendicular to said scanning direction to enable each scanning line of said color image to be scanned by light of red, green, and blue colors passing through said red, green, and blue stripe filters, respectively.

3. The apparatus of claim 2, wherein said means for controlling operates such that a given scanning line is scanned by light of a first one of said colors when said surface to be scanned is at a first position scanning of said given line is interrupted, and said surface to be scanned is moved to a second position where said given scanning line is scanned by light of a second one of said colors.

4. The apparatus of claim 2, further comprising a frame memory for storing red, green, and blue data for each scanning line to be formed on said surface to be scanned, wherein said means for controlling operates by moving said surface to be scanned to successive positions at predetermined intervals, by scanning said electron beam at each of said successive positions so as to cause said surface to be scanned to be scanned by light of each of said red, green, and blue colors, and by modulating said electron beam in accordance with data from said frame memory.

* * * * *